(12) United States Patent
Hayes et al.

(10) Patent No.: US 10,333,573 B2
(45) Date of Patent: Jun. 25, 2019

(54) CONTROLLING DEVICE HAVING MULTIPLE USER INTERFACES

(71) Applicant: Universal Electronics Inc., Santa Ana, CA (US)

(72) Inventors: Patrick H. Hayes, Mission Viejo, CA (US); Sandro David Klein, Cypress, CA (US)

(73) Assignee: Universal Electronics Inc., Santa Ana, CA (US)

( * ) Notice: Subject to any disclaimer, the term of this patent is extended or adjusted under 35 U.S.C. 154(b) by 0 days.

(21) Appl. No.: 15/981,041

(22) Filed: May 16, 2018

(65) Prior Publication Data

US 2018/0337702 A1 Nov. 22, 2018

Related U.S. Application Data

(63) Continuation of application No. 12/961,889, filed on Dec. 7, 2010, now Pat. No. 10,116,344, which is a continuation of application No. 10/922,673, filed on Aug. 20, 2004, now Pat. No. 7,872,642.

(60) Provisional application No. 60/552,969, filed on Mar. 12, 2004.

(51) Int. Cl.
*H04B 1/20* (2006.01)

(52) U.S. Cl.
CPC .................... *H04B 1/202* (2013.01)

(58) Field of Classification Search
CPC .... G08C 17/02; G08C 19/00; G08C 2201/93; G08C 17/00; G08C 23/04; G08C 19/16; G08C 2201/40; G08C 2201/50; G08C 2201/91; G08C 2201/30

USPC ........................................................ 340/12.22
See application file for complete search history.

(56) References Cited

U.S. PATENT DOCUMENTS

| | | | |
|---|---|---|---|
| 4,623,887 A | 11/1986 | Welles, II | |
| 4,959,810 A | 9/1990 | Darbee et al. | |
| 5,164,723 A | 11/1992 | Nebenzahl | |
| 5,255,313 A | 10/1993 | Darbee | |
| 5,408,060 A * | 4/1995 | Muurinen ................ | G05G 1/02 200/310 |
| 5,481,256 A | 1/1996 | Darbee et al. | |
| 5,552,917 A | 9/1996 | Darbee et al. | |
| 5,614,906 A | 3/1997 | Hayes et al. | |
| 5,743,616 A | 4/1998 | Giuliano et al. | |
| 5,959,751 A | 9/1999 | Darbee et al. | |
| 6,014,092 A | 1/2000 | Darbee et al. | |
| 6,104,334 A | 8/2000 | Allport | |
| 6,225,938 B1 | 5/2001 | Hayes et al. | |

(Continued)

FOREIGN PATENT DOCUMENTS

JP 08-079339 A 3/1996

*Primary Examiner* — Mark S Blouin
(74) *Attorney, Agent, or Firm* — Greenberg Traurig, LLP

(57) ABSTRACT

A controlling device having a plurality of user selectable operating modes, a user interface providing a plurality of function keys each operable to cause a transmission of at least one command to at least one of a plurality of appliances for commanding at least one operating function of the at least one of the plurality of appliances, and a light source for illuminating the user interface in multiple distinct colors. The light source is caused to illuminate the user interface in at least one of the multiple distinct colors as a function of a one of the plurality of operating modes in which the controlling device is currently placed.

11 Claims, 14 Drawing Sheets

(56) References Cited

U.S. PATENT DOCUMENTS

| | | |
|---|---|---|
| 6,507,306 B1 | 1/2003 | Griesau et al. |
| 6,747,591 B1 | 6/2004 | Lilleness et al. |
| 6,761,462 B2 * | 7/2004 | Yoshida ................ G06F 3/0202 |
| | | 362/109 |
| 6,791,467 B1 * | 9/2004 | Ben-Ze'ev ............. G08C 19/28 |
| | | 340/12.25 |
| 6,794,992 B1 * | 9/2004 | Rogers ................... H04B 1/202 |
| | | 340/5.61 |
| 6,879,254 B1 | 4/2005 | Graham |
| 6,917,005 B2 | 7/2005 | Sasaki |
| 7,027,037 B2 * | 4/2006 | Dowd ................... G06F 3/0238 |
| | | 345/170 |
| 2003/0025840 A1 | 2/2003 | Ailing |
| 2003/0103088 A1 | 6/2003 | Dresti et al. |
| 2005/0018413 A1 | 1/2005 | Hoffman |

\* cited by examiner

CONTROLLING DEVICE HAVING
MULTIPLE USER INTERFACES

RELATED APPLICATION DATA

This application claims the benefit of and is a continuation of U.S. application Ser. No. 12/961,889, filed on Dec. 7, 2010, which application claims the benefit of and is a continuation of U.S. application Ser. No. 10/922,673, filed on Aug. 20, 2004, which application claims the benefit of U.S. Provisional Application No. 60/552,969, filed on Mar. 12, 2004, the disclosures of which are incorporated herein by reference in their entirety.

BACKGROUND

The following relates generally to controlling devices and, more particularly, to a controlling device having multiple user interfaces.

Manufacturers typically provide a remote control with an appliance and, as such, different appliance types of different manufacturers are often commanded with different remote controls. To minimize the number of individual remote controls a user requires, universal remote controls have been developed. Accordingly, universal remote controls for commanding various functions of various types of appliances of various manufacturers have become quite widespread. By way of example, universal remote controls are described in commonly assigned U.S. Pat. Nos. 4,959,810, 5,255,313 and 5,552,917.

For selecting which of multiple appliances a universal remote control is to command, a universal remote control may allow a user to place, i.e., configure, the universal remote control into an operational mode whereby the function keys will be used to transmit commands to a "primary" target appliance that has been associated with that operational mode. For example, a "TV" operational mode may be selected to place the universal remote control into an operational mode whereby function keys are used to transmit commands primarily to a designated television, a "VCR" mode may be selected to place the universal remote control into an operational mode whereby function keys are used to transmit commands primarily to a designated VCR, etc. A universal remote control may also be provided with an ability to be configured in a "home theater" operational mode (i.e., one established to facilitate a particular activity), a "user" operational mode (i.e., one established for a particular user), "room" operational mode (i.e., one established for a particular room), or the like (collectively referred to hereinafter as a "home theater" operational mode). In a "home theater" operation mode, the universal remote control will generally be adapted to command multiple, target appliances. For example, a "home theater" mode may be established whereby volume function keys are used to transmit volume control commands to an amplifier, transport function keys are used to transmit transport control commands to a VCR, channel function keys are used to transmit channel control commands to a cable box, picture control function keys are used to transmit picture control commands to a television, etc.

In the case of universal remote controls having a display, the various function keys associated with the various operational modes are typically presented to a user in multiple, different user interfaces each comprising one or more displayed soft keys. For example, commonly assigned U.S. Patent Application No. 2003/0103088A1 discloses a universal remote control application for use in connection with a hand-held device having a display, e.g., a personal digital assistant ("PDA"), wherein the display is utilized to present the user with multiple, different user interfaces. However, while the use of a display advantageously allows a universal remote control to present a user with multiple, different user interfaces, what is needed is a more cost effective means for providing a universal remote control with multiple, different user interfaces.

SUMMARY

In accordance with this and other needs, the following generally discloses a controlling device having a face panel on which is carried both a first user interface activatable to cause transmission of at least one command to at least one appliance and a second user interface activatable to cause transmission of at least one command to at least one appliance. A first source of energy is used to cause the first user interface to be displayed on the face panel more prominently relative to the second user interface and a second source of energy is used to cause the second user interface to be displayed on the face panel more prominently relative to the first user interface. In this manner, multiple user interfaces may be provided to the controlling device while being able to maintain the overall size and cost of the controlling device to acceptable levels. In another embodiment, an element of a user interface on a face panel of a controlling device is arranged to reflect light energy from a source of light energy that the element of the user interface will be provided with a discernable visual appearance as a result of the source of light energy being turned on.

A better appreciation of the objects, advantages, features, properties, and relationships of the disclosed controlling devices will be obtained from the following detailed description and accompanying drawings which set forth illustrative embodiments which are indicative of the various ways in which the principles described hereinafter may be employed.

BRIEF DESCRIPTION OF THE DRAWINGS

For use in better understanding the exemplary controlling devices described hereinafter reference may be had to the following drawings in which.

DETAILED DESCRIPTION

For allowing a single controlling device 100 to present a user with multiple user interfaces, the following discloses a controlling device having a face panel on which is carried both a first user interface activatable to cause transmission of at least one command to at least one appliance and a second user interface activatable to cause transmission of at least one command to at least one appliance. A first source of energy is used to cause the first user interface to be displayed on the face panel more prominently relative to the second user interface and a second source of energy is used to cause the second user interface to be displayed on the face panel more prominently relative to the first user interface. In this manner, multiple user interfaces may be provided to the controlling device while being able to maintain the overall size of the controlling device to an acceptable size. Furthermore, since distinct colors may be provided to the user interfaces, the user may, in some instances, be able to quickly discern the current configuration of the controlling device 100 from the color(s) visible to the user.

Figure 1:
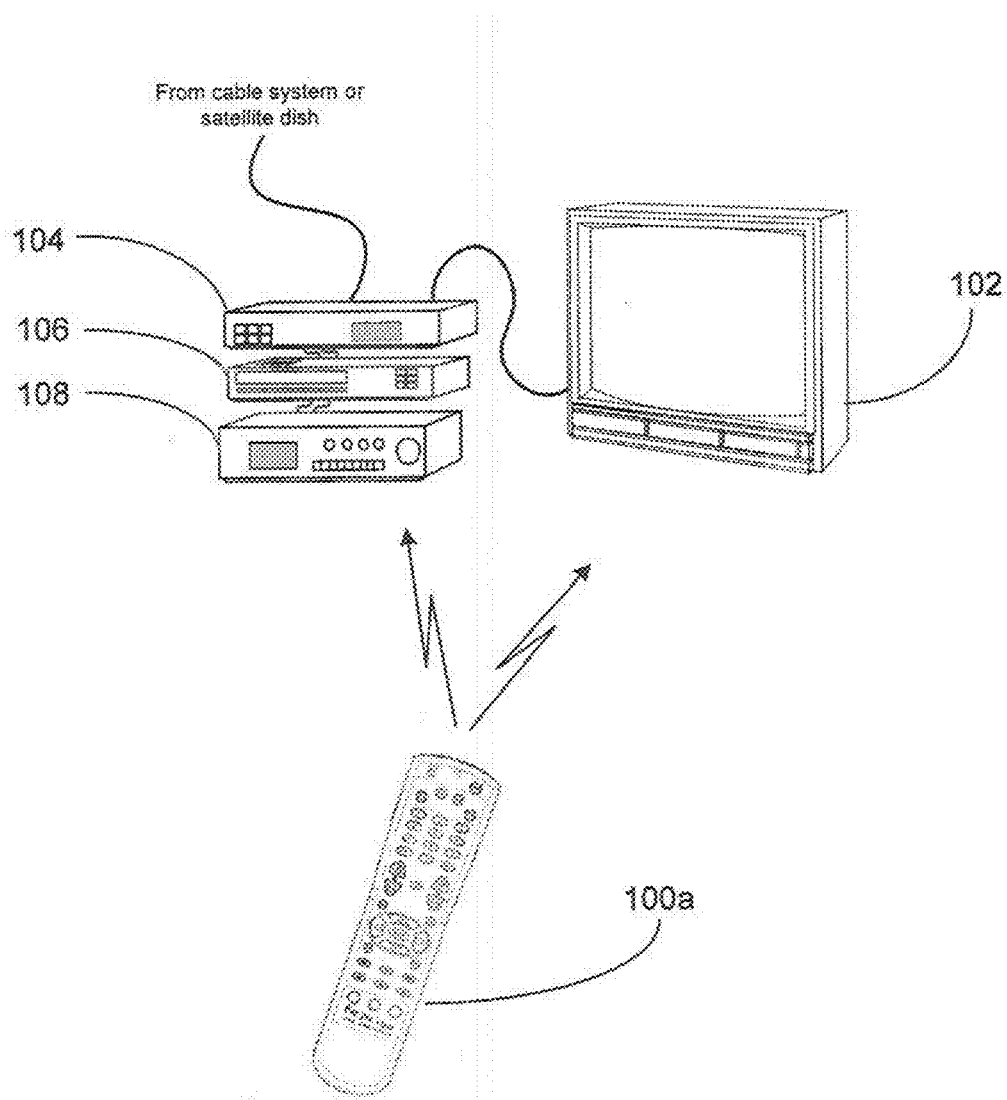
FIG. 1 illustrates an exemplary system in which the exemplary controlling devices may be utilized.

By way of example, FIG. 1 shows an exemplary system, including controllable appliances, such as a set top box ("STB") 104, a VCR 106, an audio amplifier/receiver 108 and a television 102, as well as a controlling device 100a. The controlling device 100a is capable of transmitting commands to the appliances, using any convenient IR, RF, Point-to-Point, or networked protocol, to cause the appliances to perform operational functions. While illustrated in the context of a STB 104 with VCR 106, audio system 108 and television 102, it is to be understood that controllable appliances can include, but are not limited to, televisions, VCRs, DVRs, DVD players, cable or satellite converter set-top boxes (STBs), amplifiers, CD players, game consoles, home lighting, drapery controls, fans, HVAC systems, thermostats, personal computers, etc.

Figure 2:
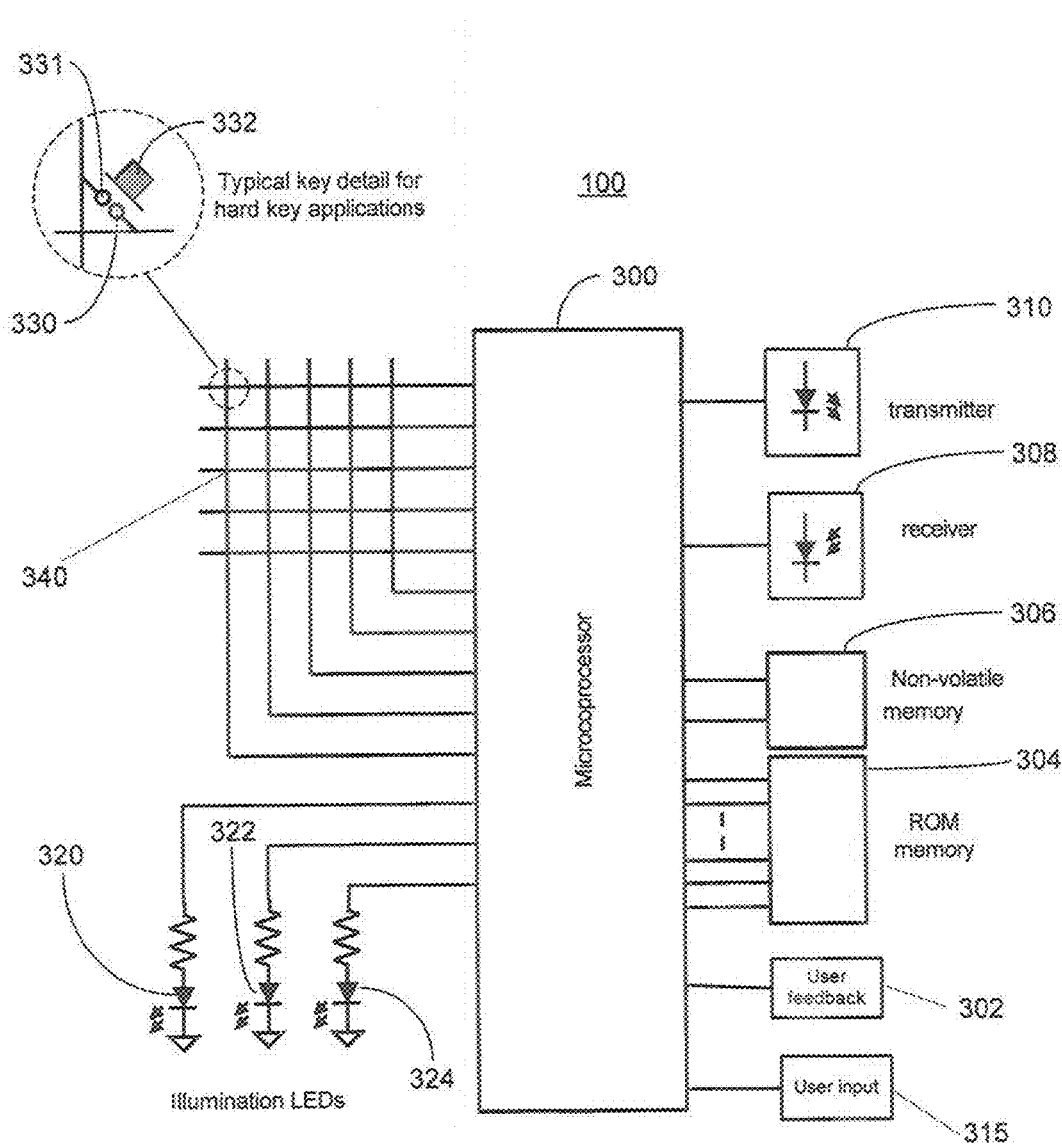
FIG. 2 illustrates a block diagram of exemplary components of the exemplary controlling devices.

For use in commanding the functional operations of one or more appliances, the controlling devices 100 may include, as needed for a particular application, a processor 300 coupled to a ROM memory 304, a key matrix 340 (e.g., hard keys, soft keys such as a touch sensitive surface overlaid on a liquid crystal display (LCD), electroluminescent display (EL), an underlying surface on which key icons are printed or etched, or a combination thereof), transmission circuit(s) 310, receiver circuit(s) 308 and/or transceiver circuit(s) (e.g., IR and/or RF), a non-volatile read/write memory 306, a means 302 to provide feedback to the user (e.g., LED, display, speaker, and/or the like), a means 315 (such as a microphone, etc.) for receiving additional non-keypress input from the user, and means for providing visual and/or audio cues to the user, as illustrated in FIG. 2.

The means for providing visual and/or audio cues to the user so as to disseminate information to the user may be embodied as key illumination means, a device face illumination means, a sound or voice synthesizer circuit and/or a digital recording and playback circuit (for example to allow a user to playback sound or voice tags input via a microphone or otherwise downloaded into the controlling device). The key illumination means may be in the form of separate elements, such as LEDs 320, 322, and 324, either directly associated with a hard key matrix or used for indirect general illumination of an area such as in the case of an internally illuminated translucent display panel, i.e., a face panel that allows all or some incident light to pass completely through it, or may be integrated as part of the key matrix, for example in the case where the key matrix is implemented using a touch screen display overlaid on an LCD, EL or ink screen printed display panel. In the case where the controlling device 100 includes hard keys, an exemplary molded-in key 332 is shown as operative with key matrix circuit 330,331. The nature and function of keys 332 on the remote are described in greater detail below.

As will be understood by those skilled in the art, the ROM memory 304 may include executable instructions that are intended to be executed by the processor 300 to control the operation of the remote control 100. In this manner, the processor 300 may be programmed to control the various electronic components within the remote control 100, e.g., to monitor the power supply (not shown), to cause the transmission of signals, control the key illumination means 320, 322, and 324, sound circuits, device face illumination means, etc. The non-volatile read/write memory 306, for example an EEPROM, battery-backed up RAM, Smart Card, memory stick, or the like, may be provided to store setup data and parameters as necessary. While the memory 304 is illustrated and described as a ROM memory, memory 304 can also be comprised of any type of readable media, such as ROM, RAM, SRAM, FLASH, EEPROM, or the like. Preferably, the memory 304 is non-volatile or battery-backed such that data is not required to be reloaded after battery changes. In addition, the memories 304 and 306 may take the form of a chip, a hard disk, a magnetic disk, and/or an optical disk.

To cause the controlling device 100 to perform an action, the controlling device 100 is adapted to be responsive to events, such as a sensed user interaction with the key matrix 340, receipt of a transmission via receiver 308, etc. In response to an event, appropriate instructions within the memory 304 may be executed. For example, when a function command key is activated on the controlling device 100, the controlling device 100 may retrieve a command code corresponding to the activated function command key from memory 304 and transmit the command code to an intended target appliance, e.g., STB 104, in a format recognizable by that appliance. It will be appreciated that the instructions within the memory 304 can be used not only to cause the transmission of command codes and/or data to the appliances, but also to perform local operations. While not limiting, local operations that may be performed by the controlling device 100 may include displaying information/data, favorite channel setup, macro key setup, function key relocation, user programming of favorite channel selections, etc. A further, local operation is the ability to "lock" function keys across device operational modes as described in U.S. Published Patent Application No. 2003/0025840. Examples of still further local operations can be found in U.S. Pat. Nos. 5,481,256, 5,959,751, and 6,014,092.

Figure 3:
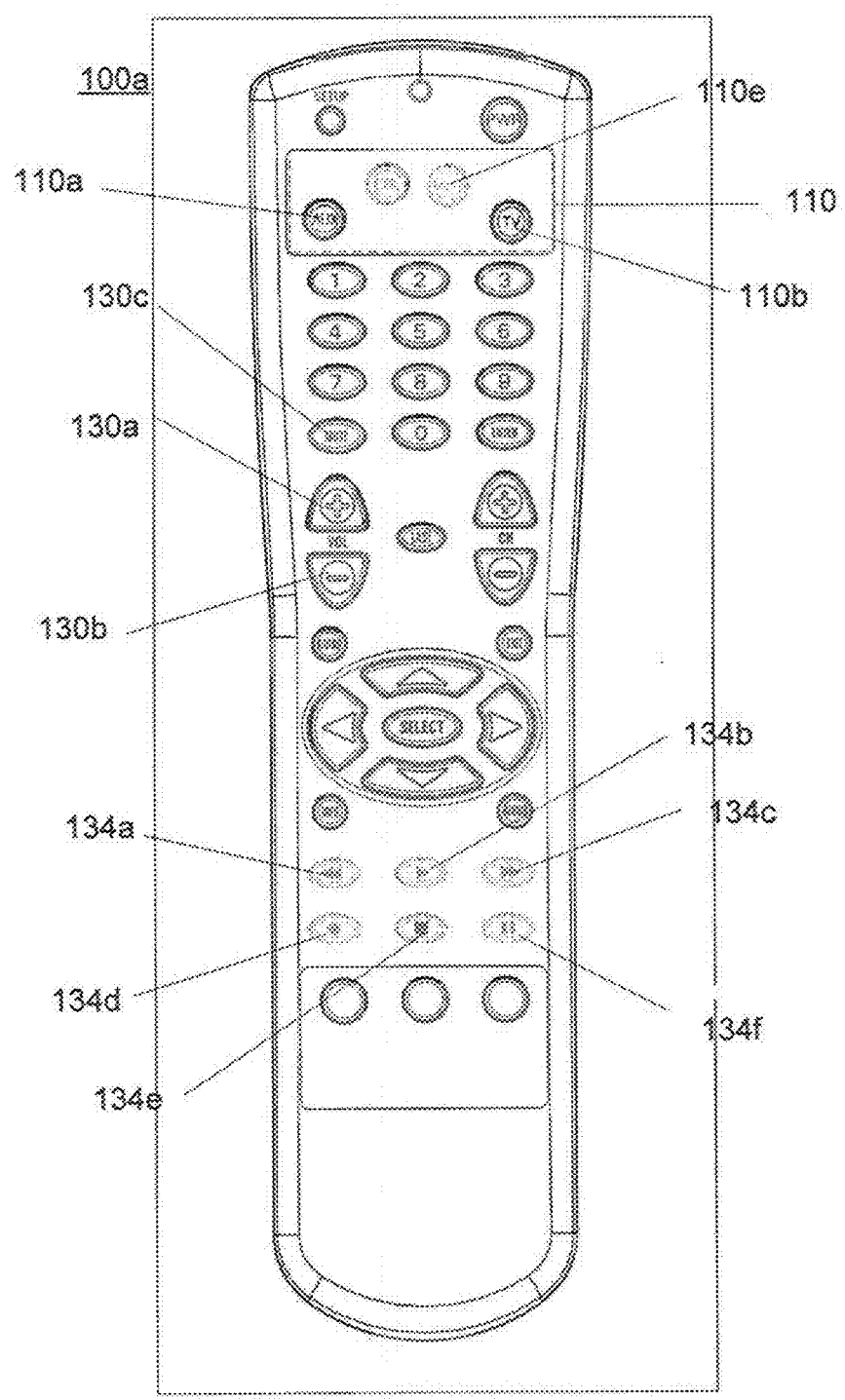
FIG. 3 illustrates an exemplary controlling device having illuminable, hard function keys.

For creating a correspondence between a command code and a function command key, data may be entered into the controlling device 100 that functions to identify an intended target appliances by its type and make (and sometimes model). Such data allows the controlling device 100 to transmit recognizable command codes in the format appropriate for such identified appliances. Typically, intended target appliances are identified for each operational mode of the controlling device 100. By way of example, FIG. 3 illustrates a controlling device 100a having a "TV" operational mode, "AUX" operational mode, "VCR" operational mode, and "CBL" operation mode which are selectable through activation of a corresponding device mode selection key 110. Since methods for setting up a controlling device to command the operation of specific home appliances are well-known, such methods need not be described in greater detail herein. Nevertheless, for additional information pertaining to setup procedures, the reader may turn to U.S. Pat. Nos. 4,959,810, 5,614,906, and 6,225,938. It will also be appreciated that the controlling device 100 may be set up to command an appliance 102 by being taught the command codes needed to command such appliance as described in U.S. Pat. No. 4,623,887. Still further, it will be understood that command codes may be pre-stored in the controlling device 100 or the controlling device 100 may be upgradeable, for example via use of receiver 308.

Figures 4A, 4B, 4C:
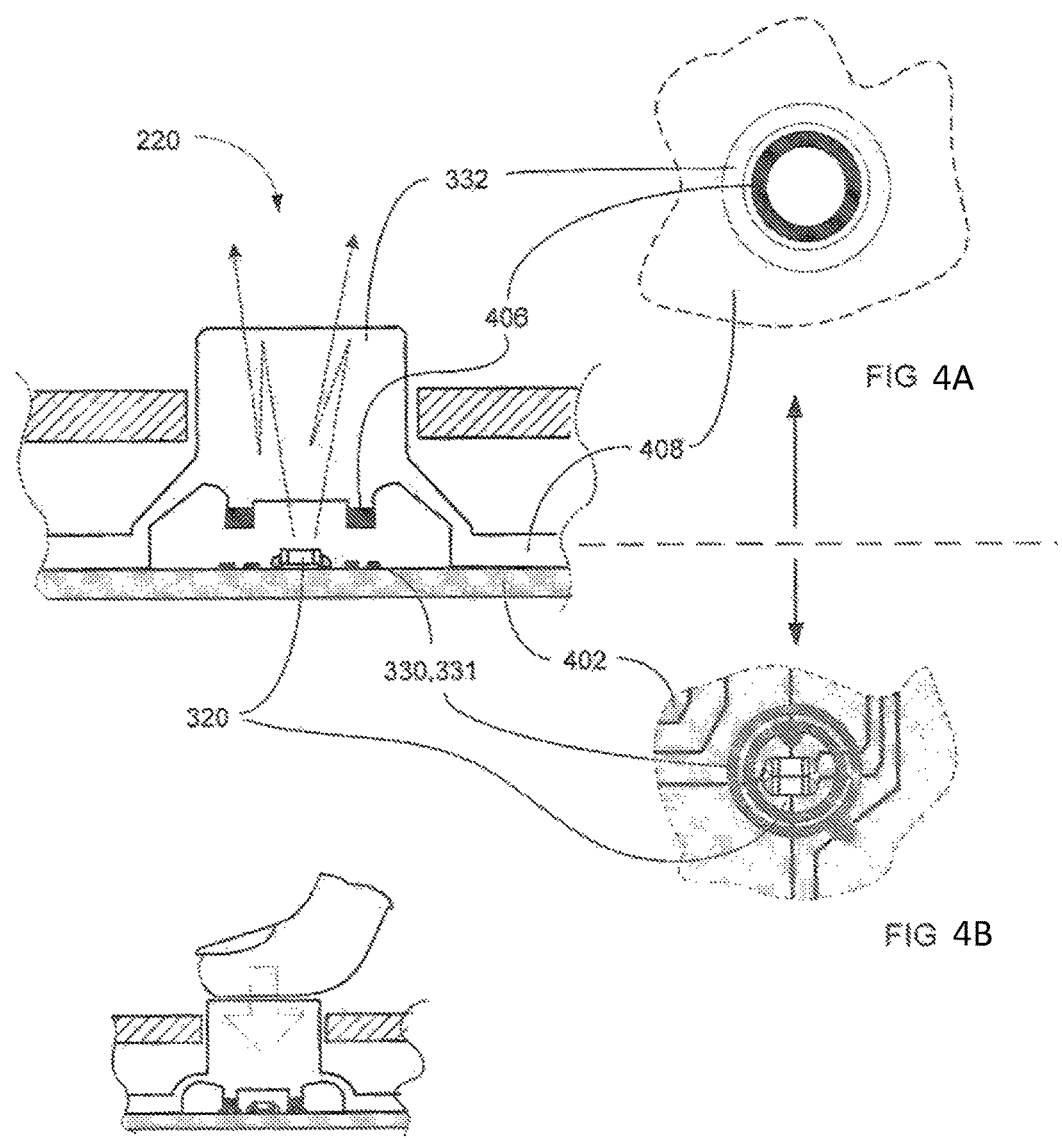
FIGS. 4A-4C illustrate a cross-sectional views of the hard function keys of the exemplary controlling device of FIG. 3.

Turning to FIG. 4, there is illustrated an exemplary mechanical construction of an illuminated key 220, such as would be used in connection with the hard keys of the controlling device 100a of FIG. 3. As is known in the art, a controlling device keypad typically comprises a silicon rubber sheet 408 with molded-in key caps 332, in this case of translucent material at least in the area of the keycap(s) 332 which are to be illuminated. The underside of the keycap 332 is equipped with conductive carbon puck 406 in the shape of a ring. Key contact areas 330 and 331, comprising conductive ink silk-screened onto the printed circuit board 402 in the form of two concentric rings, are positioned directly below the conductive puck 406 such that the key matrix circuit 330,331 is completed when key 220 is depressed as illustrated in FIG. 4c. A surface mount type LED 320 is positioned below the translucent keycap 332 such that the key may be illuminated when an LED is enabled by the microcontroller 300. Although only a single, multi-colored LED is illustrated for clarity, it will be appreciated that multiple, different colored LEDs may be easily substituted. In the illustrated case, the multi-colored LED may comprise at least two individually-controllable junctions (e.g., two primary colored LEDs) contained in a single package. With such a device, multiple colors are possible (e.g., the two primary colors and the secondary color for the combined primary colors) depending upon which LEDs are enabled. In this manner, a multi-colored LED provides three sources of light energy.

Figure 5A:
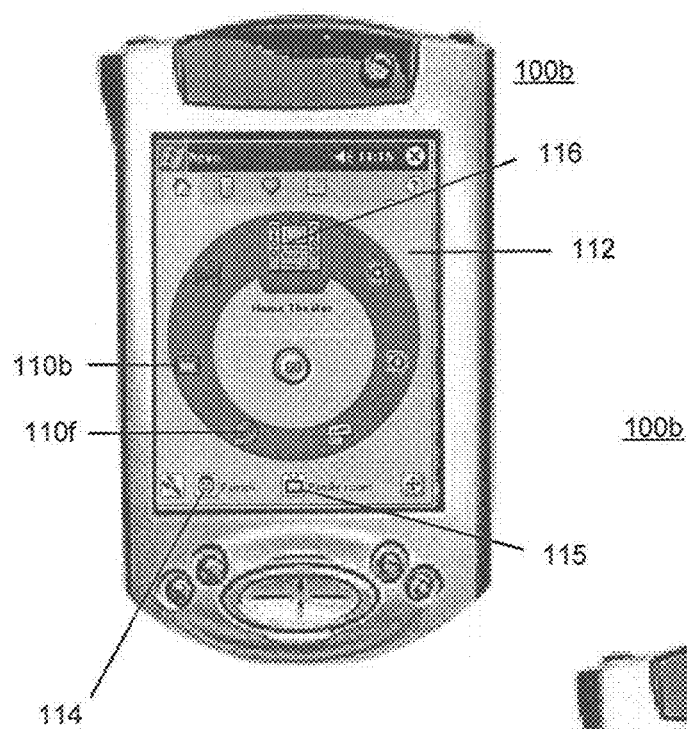
FIGS. 5A and 5B illustrate an exemplary controlling device having a touch screen display.
Figure 5B:
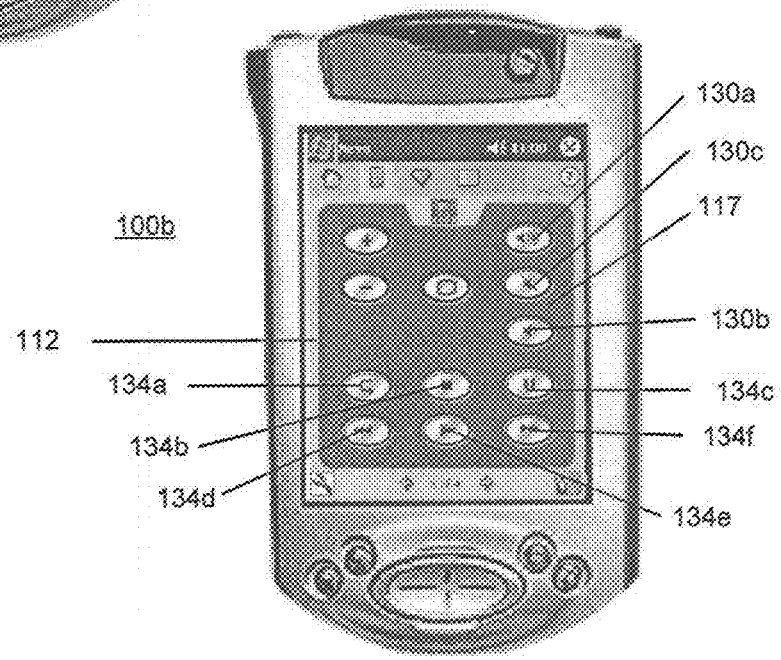

By way of further example, FIGS. 5a-5b illustrate a controlling device 100b having a display 112. In this illustrated example, the display 112 comprises a touch screen that allows a user to interact with the controlling device 100b to, for example, setup the controlling device, select operational modes of the controlling device 100b, etc. In this regard, FIG. 5a shows a selection wheel by which operational mode selection may be accomplished. For example, selecting a "device" icon 110 may place the controlling device 100b in a device operational mode (e.g., TV, VCR, etc.), selecting a "room" icon 115 may place the controlling device 100b in a mode for commanding the operation of appliances in a designated room (e.g., living room, bedroom, etc.), selecting a "user" icon 114 may place the controlling device in a mode for commanding the operation of appliances in a manner preferred by that user (e.g., using their favorites, macros, function key displays, etc.), or selecting a "home theater" icon 116 may place the controlling device 100b in a mode for commanding the operation of multiple appliances within a home theater system. FIG. 5b illustrates a display of example function control keys 117 in a "home theater" page. Such a display-centric controlling device is particularly described and illustrated in commonly owned U.S. application Ser. Nos. 60/264,767, 09/905,423, 09/905,432, and 09/905,396 which are incorporated herein by reference in their entirety.

Figure 6:
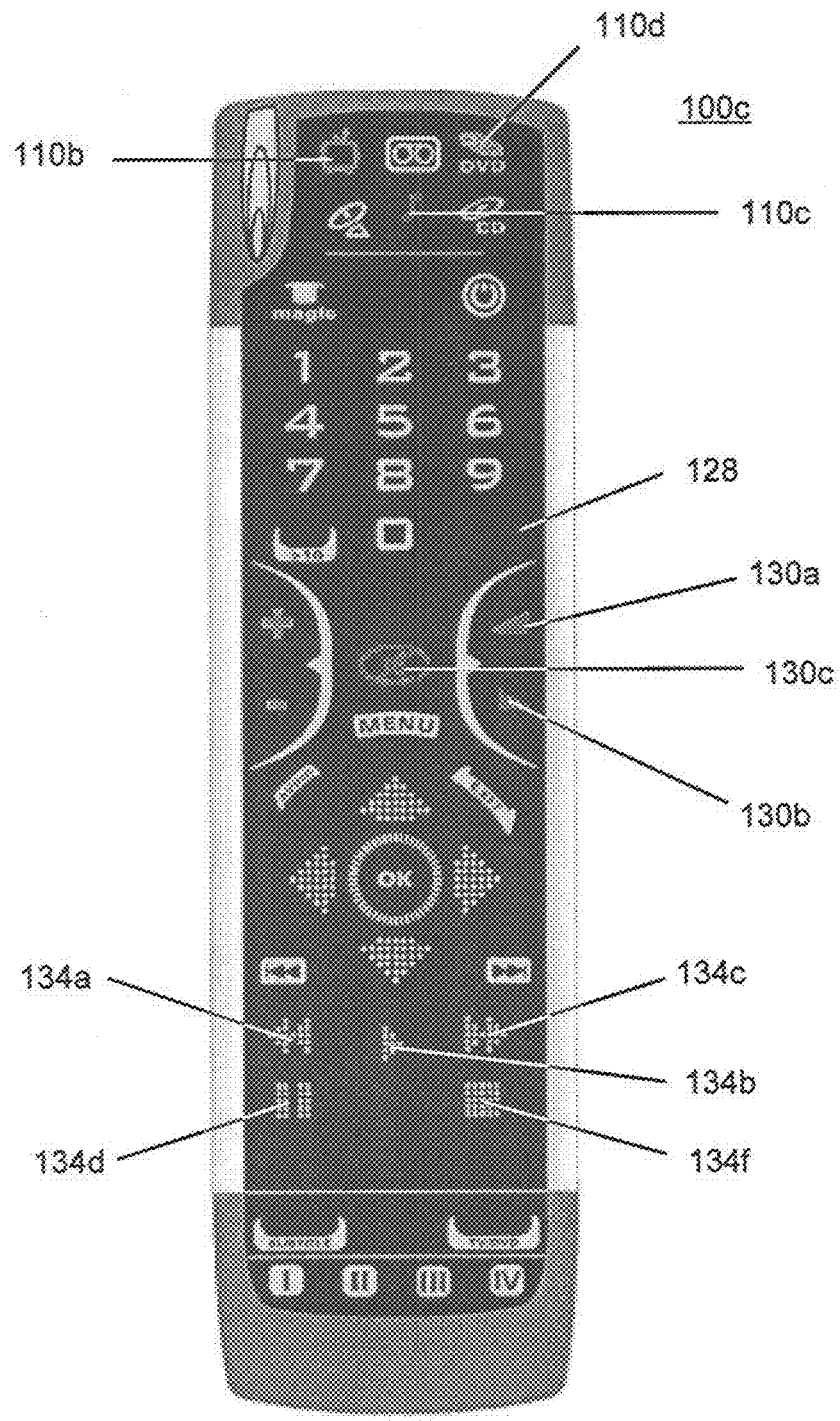
FIG. 6 illustrates an exemplary controlling device having an EL display.

By way of still further example, FIG. 6 illustrates a controlling device 100c which includes an electro-luminescent display 128. Unlike the controlling device 100a illustrated in FIG. 3, which includes silicon rubber keypads protruding through cut-outs in a hard plastic upper housing, the controlling device 100c uses a flexible, segmented electroluminescent ("EL") panel that is overlaid over a dome switch style key matrix. An example controlling device having such an EL panel is particularly illustrated and described in commonly owned U.S. application Ser. No. 10/410,103. Of particular note, the EL panel may be constructed to allow various parts of the display to be independently illuminated using different colors under control of the microprocessor 300 and an EL display interface.

Figure 8:
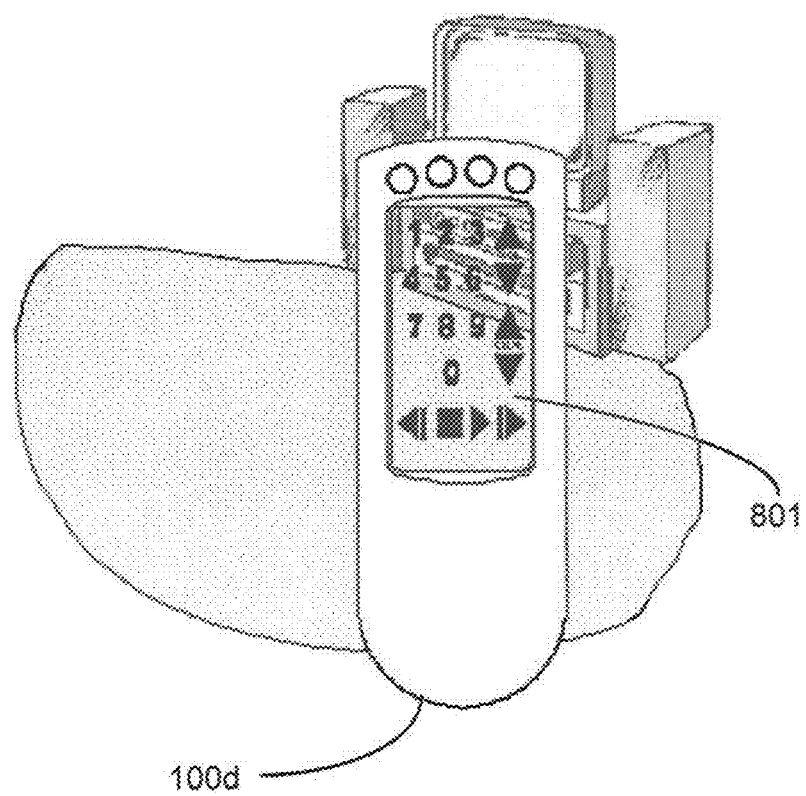
FIG. 8 illustrates an exemplary controlling device having an internally illuminable, translucent device face.
Figure 9:
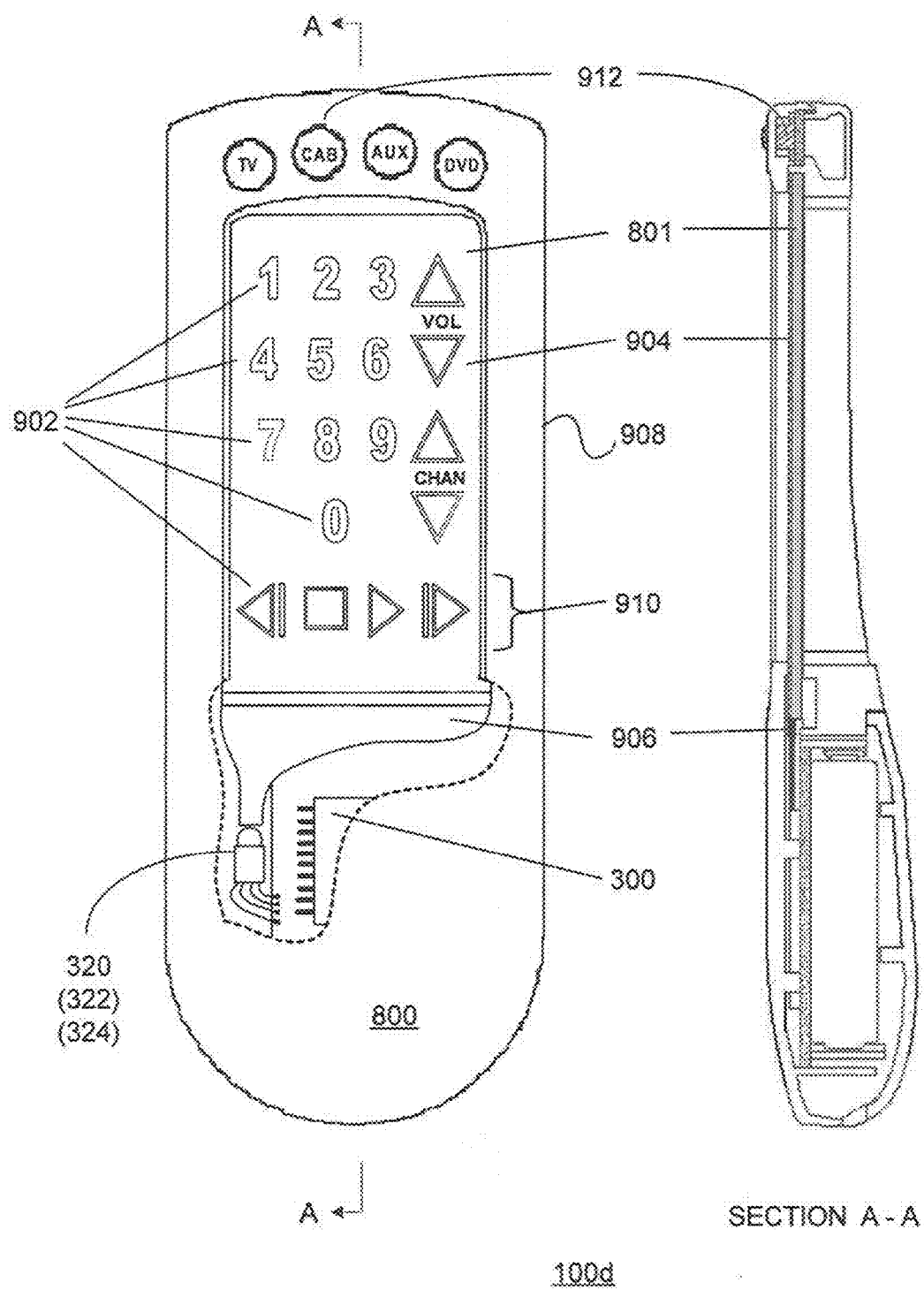
FIG. 9 illustrates the construction and key configuration of an exemplary controlling device having an internally illuminable, translucent device face.

Yet further, FIGS. 8 and 9 illustrate a controlling device 100d having a translucent display face 801 (i.e., a face that allows for the passage of at least some incident light). The display face 801 is preferably made from a light conducting material and includes an overlay with touch-sensitive keys. It will be understood that various materials with differing degrees of light pass-through may be used in the construction of the translucent display face 801 without departing from the spirit of this invention. Accordingly the term "translucent" is intended to include all possible degrees of light transmissivity and dispersion, spanning the gamut from fully transparent (100% transmissivity with no dispersion or scattering) through almost opaque (low transmissivity and/or high dispersion/scattering.)

Turning to FIG. 9, display face 801 is printed or etched with icons 902 representative of various controlling device keys, e.g., operational mode and function keys. Overlaying display face 801 is a touch panel 904 comprising a matrix of touch sensitive segments corresponding to the printed icons, such that touches to the area of each individual icon form uniquely identifiable inputs to microcontroller 300 for causing the controlling device to perform an activity, such as transmitting commands to an appliance, entering a mode of operation, etc., all of which is well known in the art. Where desired, hard keys, for example device mode selection keys 912 in the illustrated embodiment, may also be provided.

Display face 801 may be internally illuminated by one or more sources of light energy—either visible or outside of the visible spectrum. In the illustrated example, the sources of light energy comprise LEDs 320, 322, 324 which transmit light via a light pipe 906 (comprised, for example, of optical fibers) attached to the bottom edge of the display face. It will be appreciated that in general LEDs 320-324 may comprise separate individually colored LEDs or may comprise a single multi-color capable component as illustrated. In this manner, the entire display face 801 may be illuminated in different colors by energizing different of LED groups and/or different elements in a multi-colored LED group.

In an alternative embodiment (not illustrated) illumination LEDs may be positioned around the circumference of the display face 801, for example within openings formed in the sides of the material from which the case 908 is formed. Again, these LEDs may include groupings of one or more single colored LEDs and/or multi-colored LEDs distributed about the outside of the display face 801. In this embodiment, when one or more LED groupings are illuminated, an area of display face 801 is illuminated the corresponding color. The display face 801 may thus be simultaneously illuminated in multiple, different color zones by energizing different combinations of LED groups and/or by energizing different combinations of elements in a multi-colored LED group.

Additional methods for selectively illuminating the display face internally may be possible without departing from the spirit and scope of the current invention, for example, a single color LED (i.e., a white light LED) may be used in conjunction with one or more color filters and/or lenses mechanically operable to cause different illumination colors or hues within the display face. It will also be understood that well known translucent LCD methods may be used to accomplish the various aspects and features contemplated by the current invention, either independently or in conjunction with other display illumination techniques described herein. For example, translucent LCD's effectively mask or filter light passing through portions of the display, and may be used in conjunction with light sensitive inks and other illumination and coloring techniques described herein to present a rich functional environment to a user or users.

The ability to independently illuminate (or in the case of a translucent LCD, mask or filter) various parts of the controlling device 100, e.g., the keys and/or display, with different light wavelengths (i.e., light colors) may be used to advantageously provide a user of the controlling device 100 with a visual indication as to which appliance a command should be transmitted to (e.g., the intended target) when a function key is activated. For example, a color association between a function key and an appliance may be used to provide a user with information indicative of which function keys are locked to which appliances across the various "device" modes. Still further, the color association between a function key and an appliance may be used to provide a user with information indicative of which function key is assigned to which appliance when multiple appliances are controllable from a user interface, e.g., when the controlling device 100 is in a "home theater" operational mode. Yet further, the function keys and/or function key background may be illuminated a color to indicate in which user operational mode or which room operational mode the controlling device 100 is currently placed into. For example, the display face 801 may be illuminated red when the controlling device is currently in one user's operational mode (e.g., the remote control is configured to use their favorites, macros, etc.) and may be illuminated green when the controlling device is placed into another user's operational mode.

As noted, a color indicative of an intended target appliance that is associated with a function key, a user mode, or a room mode may be achieved by illuminating one or more appropriately colored LEDs (or LED elements) that are associated with the function key (e.g., in the case of "hard" keys) or display face (e.g., in the case of either "hard" or "soft" keys), by displaying an icon, area surrounding an icon, etc. with the appropriate color (e.g., in the case of "soft" keys), or by illuminating one or more appropriately colored segments of an EL panel that are associated with the function key (e.g., in the case of "EL display" keys). In any of these instances, a cue (color or sound) that is selected so as to be indicative of an intended target appliance, user operational mode, or room operational mode may be predefined or user-selectable (e.g., a user may select a color or sound from a menu, by stepping through various color or sound choices, by being downloaded and assigned, etc.). Furthermore, the absence of a color and/or sound may also be used to provide information to the user.

By way of example, FIG. 3 illustrates a controlling device 100*a* having hard keys in which the volume control function keys 130 (e.g., volume up 130*a*, volume down 130*b*, and mute 130*c* function keys) have as their intended target the appliance designated as the intended target when the appliance is in the "AUX" device mode. The relationship between the function keys and the "AUX" device as the intended target may be presented to the user by causing each of the volume control function keys 130 to be illuminated, by means of illuminating the appropriate LED(s), with a red color. In this case, the user may simply know that the color red is indicative of a function key having the "AUX" device as its intended target. The relationship between the function keys and the "AUX" device as the intended target may also be presented to the user by causing the "AUX" device mode selection key 110*a* to be optionally illuminated the same color as the function keys that have the "AUX" device as the intended target, e.g., by also causing the "AUX" device mode selection key 110*a* to be illuminated red. Similarly, a relationship between the transport control function keys 134 (e.g., the rewind 134*a*, play 134*b*, fast forward 134*c*, record 134*d*, stop 134*e*, and pause 134*f* function keys) and the "VCR" device as the intended target may be presented to the user by causing each of the transport control function keys 134 to be illuminated with a green color. Again, the "VCR" device mode selection key 100*e* may be illuminated with the same green color to allow a user to discern the relationship between the device mode intended target appliance and the function keys 134.

By way of still further example, FIG. 5*b* illustrates a "home theater" page of the controlling device 100*b* in which the volume control function keys 130 (e.g., volume up 130*a*, volume down 130*b*, and mute 130*c* function keys) have as their intended target the appliance designated as the intended target when the appliance is in the "TV" device mode. The relationship between the function keys and the "TV" device as the intended target may be presented to the user by causing each of the volume control function keys 130 (or areas surrounding or in the vicinity of the volume control function keys 130) to be illuminated, by means of displaying, a red color. In this case, the user may simply know that the color red is indicative of a function key having the "TV" device as its intended target. The relationship between the function keys and the "TV" device as the intended target may also be presented to the user by causing the "TV" device mode selection key 110*b* to be optionally illuminated the same color as the function keys that have the "TV" device as the intended target, e.g., by also causing the "TV" device mode selection key 110*b* of the device selection page, illustrated in FIG. 5*a*, or appropriate area(s) adjacent thereto, to be illuminated red. Similarly, a relationship between the transport control function keys 134 (e.g., the rewind 134*a*, play 134*b*, fast forward 134*c*, stop 134*e*, and pause 134*f* function keys) and the "DVD" device as the intended target may be presented to the user by causing each of the transport control function keys 134 (or areas surrounding or in the vicinity of the transport control function keys 134) to be illuminated with a green color. Again, the "DVD" device mode selection key 100*f* may be illuminated with the same green color, for example in the mode selection page of FIG.

5a, to allow a user to discern the relationship between the device mode intended target appliance and the function keys 134.

By way of yet another example, FIG. 6 illustrates a controlling device 100c having an EL display in which the volume control function keys 130 (e.g., volume up 130a, volume down 130b, and mute 130c function keys) have as their intended target the appliance designated as the intended target when the appliance is in the "AMPLIFIER" device mode. The relationship between the function keys and the "AMPLIFIER" device as the intended target may be presented to the user by causing each of the volume control function keys 130 (or areas surrounding or in the vicinity of the volume control function keys 130) to be illuminated, by means of illuminating the appropriate EL segment(s), with a red color. In this case, the user may simply know that the color red is indicative of a function key having the "AMPLIFIER" device as its intended target. The relationship between the function keys and the "AMPLIFIER" device as the intended target may also be presented to the user by causing the "AMPLIFIER" device mode selection key 110c to be optionally illuminated the same color as the function keys that have the "AMPLIFIER" device as the intended target, e.g., by also causing the "AMPLIFIER" device mode selection key 110c, or appropriate area(s) adjacent thereto, to be illuminated red. Similarly, a relationship between the transport control function keys 134 (e.g., the rewind 134a, play 134b, fast forward 134c, stop 134e, and pause 134f function keys) and the "DVD" device as the intended target may be presented to the user by causing each of the transport control function keys 134 (or areas surrounding or in the vicinity of the transport control function keys 134) to be illuminated with a green color. Again, the "DVD" device mode selection key 100f may be illuminated with the same green color to allow a user to discern the relationship between the device mode intended target appliance and the function keys 134.

If, for example, the volume transport function keys 134 and the volume control function keys 132 are locked to their respective devices, the transport function keys 134 and the volume control function keys 132 may continue to be illuminated using an appropriate device-indicative color even when the controlling device 100 is placed into others of its various home theater, room, or device operational modes. It will be appreciated that the LEDs, EL segments, display, etc. need not be constantly illuminated in a device-indicative color but that a key, motion sensor, or the like may be activatable by the user to temporarily illuminate the LEDs, EL segments, display, etc. in an appropriate color given the present operational mode of the controlling device 100 and the intended target appliance(s) of the function keys within that operational mode.

In the case of remote control 100d illustrated in FIGS. 8 and 9, use of the alternative embodiment comprising LEDs positioned around the periphery of the display together with the grouping of key functions into appropriate zones, e.g. the transport function key group 910 of FIG. 9, permits selective illumination of keys using device-indicative colors.

In an alternative embodiment of the remote control of general type 100d as illustrated in FIGS. 8 and 9, the remote control 100g of FIG. 13 uses dual sources of energy, e.g., light pipes 1302, 1304 together with independently activatable multicolor LEDs 1306, 1308, to provide visual indication of the current device assignments of function keys, such as the volume and channel keys as is described in the following paragraphs. To further enhance the visual indication provided by the sources of energy, small grooves 1310, 1312 may be formed in the underside of the transparent face panel 801 for the purpose of deflecting light generated by light sources 1302, 1304. More particularly, such enhanced visual indication may be achieved through use of the principle that light incident on a boundary between a dense medium and a less dense medium will be internally reflected whenever the angle of incidence is greater than the so-called "critical angle." This critical angle theta may be expressed as theta=arcsin($n_2/n_1$) where $n_2$ is the refractive index of the denser medium and $n_1$ the refractive index of the less dense medium.

Figure 12A:
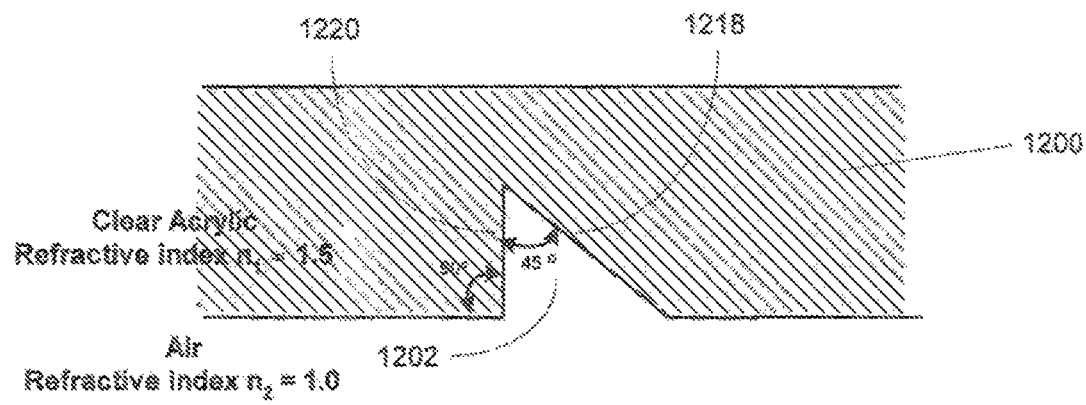
FIGS. 12A-12C illustrate an exemplary method for creating markings on the underside of a clear plastic sheet, which markings are responsive to illumination from a particular direction.
Figure 12B:
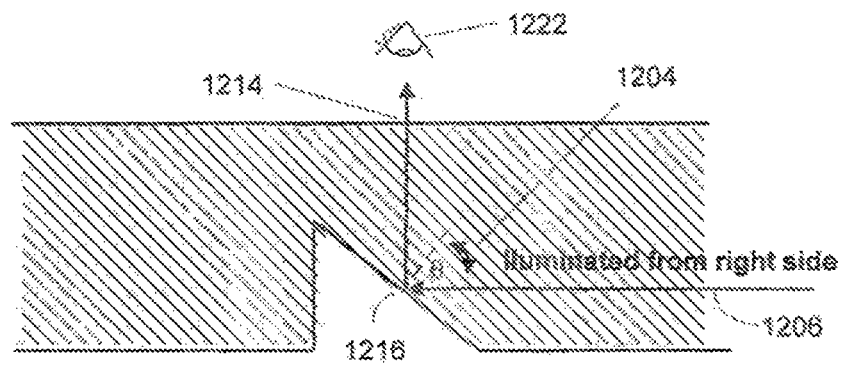
Figure 12C:
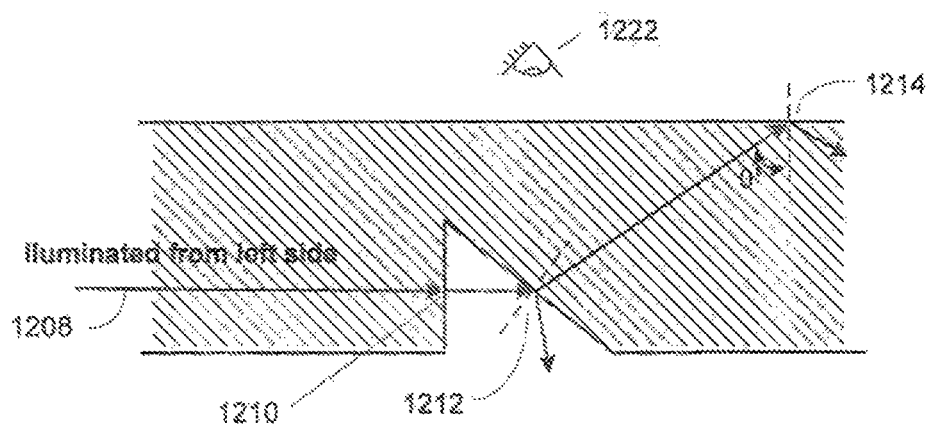

By way of example, in the case of a boundary between clear acrylic (n=~1.5) and air (n=1.0) the critical angle is approximately 41 degrees. Turning now to FIG. 12a, an exemplary groove 1202 with one perpendicular wall 1220 and one approximately 45 degree angled wall 1218 is provided on the rear surface of a transparent acrylic sheet 1200. As illustrated in FIG. 12b, if this groove is illuminated by a light source 1206 directed into the edge of the acrylic material on the side corresponding to angled wall 1218, the angle of incidence 1204 (theta>~41 deg.)☐ will be such that the light is internally reflected within the acrylic material and exits through the upper surface 1214, that is, is visible to a viewer 1222 looking into the acrylic sheet from the top. Conversely, as illustrated in FIG. 12c if groove 1202 is illuminated from the opposite side by a different light source 1208, that light will pass directly through perpendicular wall 1210 (incident light that is normal to a boundary passes through unchanged) and strike the angled wall from the opposite side 1212. However, since in this instance the light is traveling from a less dense to a more dense medium, the phenomenon of internal reflection does not apply and in general part of the light may be reflected away from the viewer and part refracted away from the viewer, i.e., back into the acrylic material which then acts like a light pipe—as shown at 1214). Regardless, substantially none of this light 1208 is directly visible to viewer 1222. It will thus be appreciated that, when light 1206 and light 1208 are simultaneously directed to a graphical user interface element including the indentation 1202, the light 1206 will predominate relative to the light 1208 in the visual appearance provided to the graphical user interface element including the indentation 1202. It will also be appreciated that, by providing multiple grooves facing in different directions, indicia which are responsive to different light sources may be provided on the underside of such a transparent surface.

Figure 13:
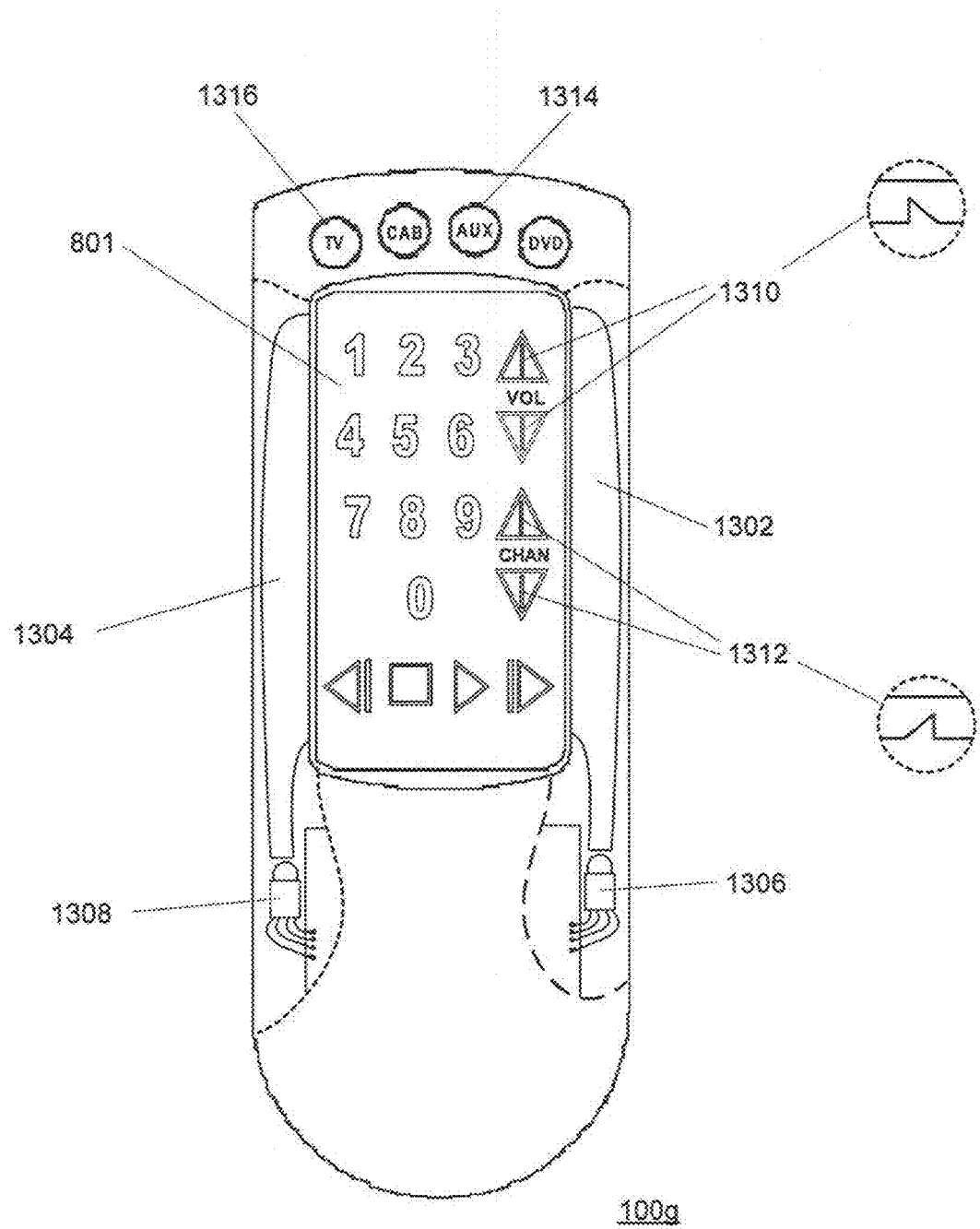
FIG. 13 illustrates another exemplary configuration of a controlling device having an internally illuminable, translucent device face, whereby indicia may be selectively highlighted to indicate different functionality assigned to different keys.

Returning now to the exemplary remote control 100g illustrated in FIG. 13, it will be understood that if, for example, grooves 1310 and 1312 are opposite facing in the manner illustrated in FIG. 13 and described above, e.g., one groove having a left side angled wall and the other groove having a right side angled wall, these grooves 1310 and 1312 may be selectively illuminated in different colors via light pipes 1302, 1304, e.g. from light energy originating from the right side and left side of the panel 801, respectively, thereby enabling the selective illumination of, for example, the illustrated volume and channel keys using device-indicative colors.

By way of a more detailed example, if the volume function of remote control 100g were currently assigned to the "AUX" device (e.g., a receiver/amplifier) associated with mode key 1314 (assigned the color green in this example) and the channel functions of remote control 100g were currently assigned to the "TV" device associated with mode key 1316 (assigned the color red in this example), then these assignments could be conveyed to the user by simultaneously energizing the red element of tri-color LED 1308 and the green element of tri-color LED 1306. In such a case, red light from LED 1308 would be injected into the left edge of panel 801 via fiber optic light pipe 1304, while green light would be simultaneously injected into the right edge of panel 801 via light pipe 1302. In accordance with the teachings presented earlier in conjunction with FIG. 12, it will be appreciated that this will thus cause grooves 1310 below the volume keys to appear green to the observer 1222 and grooves 1312 below the channel up/down keys to appear red to an observer 1222, given the orientations of grooves 1310, 1312 depicted in FIG. 13.

It should be understood that the forgoing describes various exemplary methods for providing cues to a user of a controlling device. It should also be understood that the methods described and illustrated are provided by way of example only and are not intended to be limiting. For example, the illustrated and described indicia may be of varying widths and sizes and may take the form of single lines, blocks, icons, patterns of interleaved indentations facing in different directions, etc. Indicia also need not be associated with specific individual keys but may alternatively be associated with groups of keys or areas on the face of the remote control by forming boxes, circles, highlight lines, arrows, etc. It will be further appreciated that the patterns of grooves and/or indentations comprising such indicia may be formed on the underside of a transparent material by cutting, grinding, molding, etching, stamping, embossing, or any other convenient manufacturing process. It will also be appreciated that while the illustrative embodiment described above utilizes an arrangement of LEDs with fiber optic light pipes as the source of light energy to illuminate the indicia, various other sources of light energy, such as electroluminescent strips, LEDs arranged around the periphery of the face plate, or even ambient light, may be utilized for this same purpose without departing from the spirit of the invention.

Figure 10:
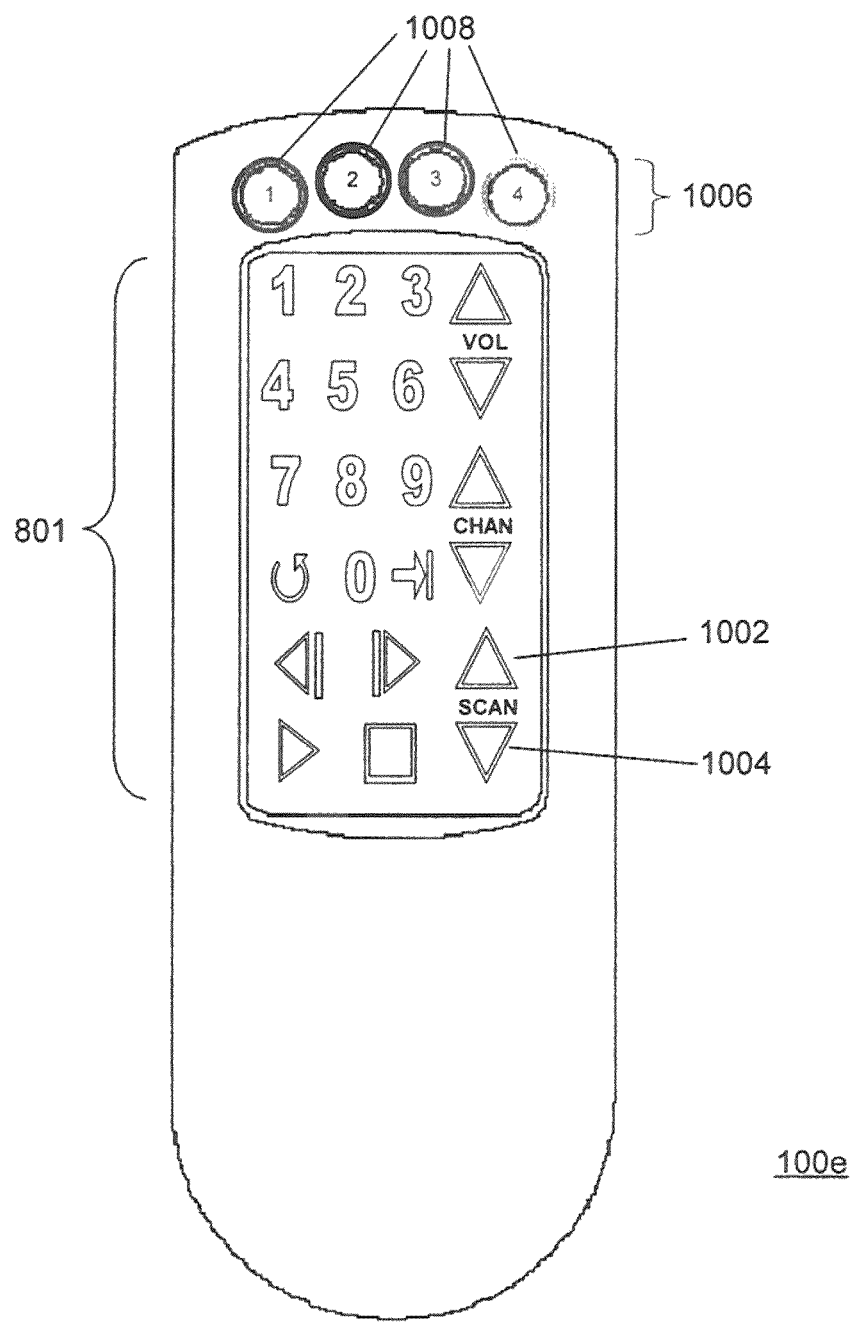
FIG. 10 illustrates a second exemplary key configuration of a controlling device having an internally illuminable, translucent device face.

In the case where operational modes are to be indicated to the user, such as user operational modes or room operational modes, it will be appreciated that all or part of an entirety of the functions keys, a display, an EL panel, or display face may be illuminated as described above to cause an information providing color to be presented to the user. By way of further example of indication of a user operational mode, remote control 100e of FIG. 10, configured for use with a satellite set top box including an integrated DVR, includes channel scan buttons 1002, 1004 which may be programmed by a user to scan back forth through a favorite subset of the greater universe of all available channels. Remote control 100e also supports up to four individual users, each with their own set of favorite channels, via four user selection buttons 1006. The user currently selected may advantageously be indicated by the illumination of the face panel in a color corresponding to an indicia 1008 (e.g., a colored ring) associated with that user's selection button.

In yet another embodiment, light of varying color, selective activation of LCD elements, or other selective illumination techniques as described above may be used to effect the display of different icons or labels for a single physical key location, depending upon the device to be controlled. Referring to FIGS. 11a through 11d, in a remote control 100f of similar construction to that already described in conjunction with FIG. 9, face panel 801' may be screen printed with icons using several different ink formulations, each ink responsive to a specified light wavelength or range of light wavelengths (i.e., the visible light color). For example a single key location label 1102 may include the label "9" printed in an ink responsive to red light, the label "Guide" in an ink responsive to blue light, and the label "Angle" in an ink responsive to green light. Illumination of the face panel in each of these respective colors may thus be used to bring different sets of labels or icons into prominence (relative to the remaining labels), depending upon the current device being controlled.

Figures 11A, 11B:
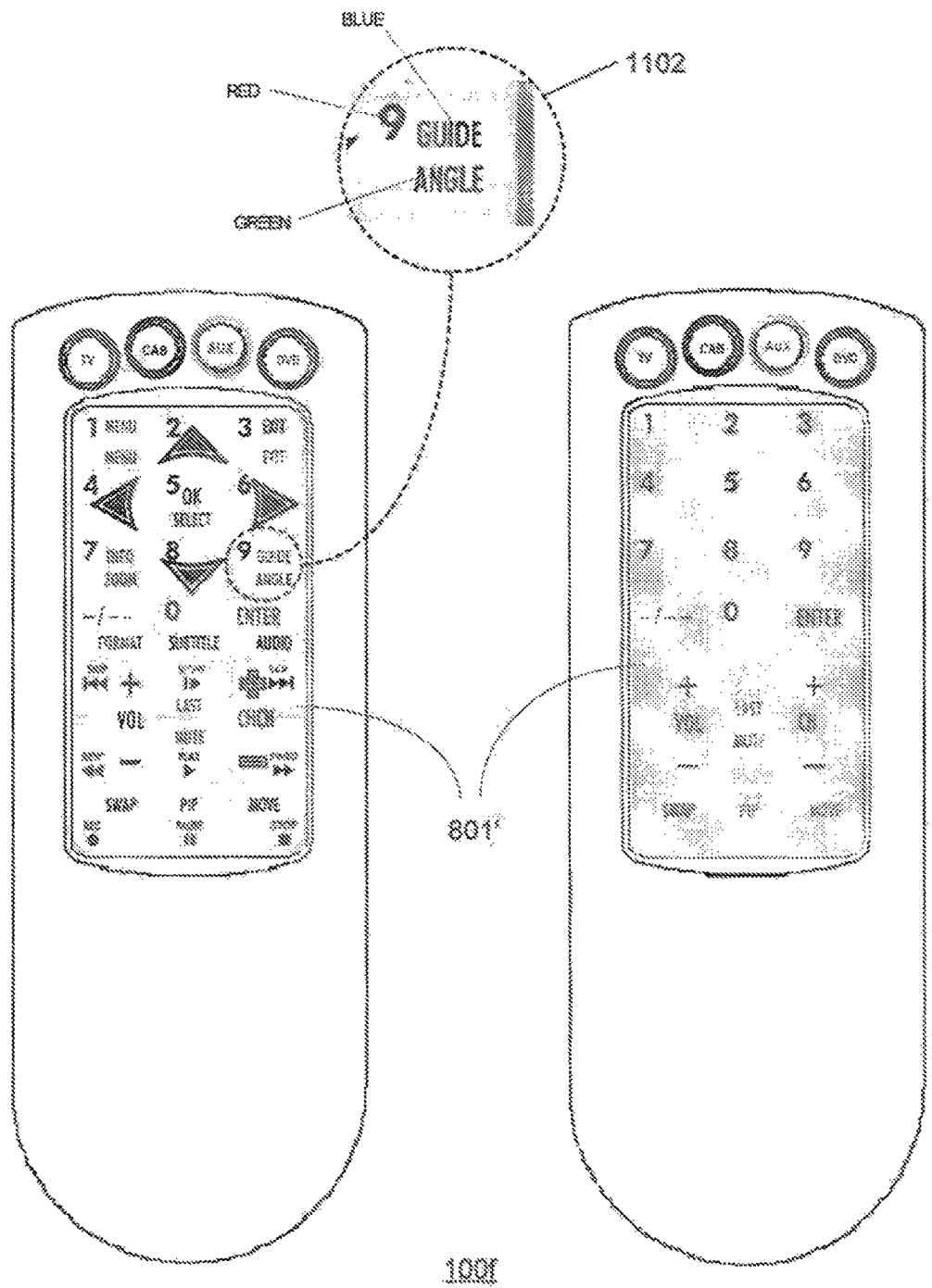
FIGS. 11A-11D illustrate a third exemplary configuration of a controlling device having an internally illuminable, translucent device face, whereby key icons may be selectively highlighted to indicate different functionality in different modes of operation.
Figure 11C:
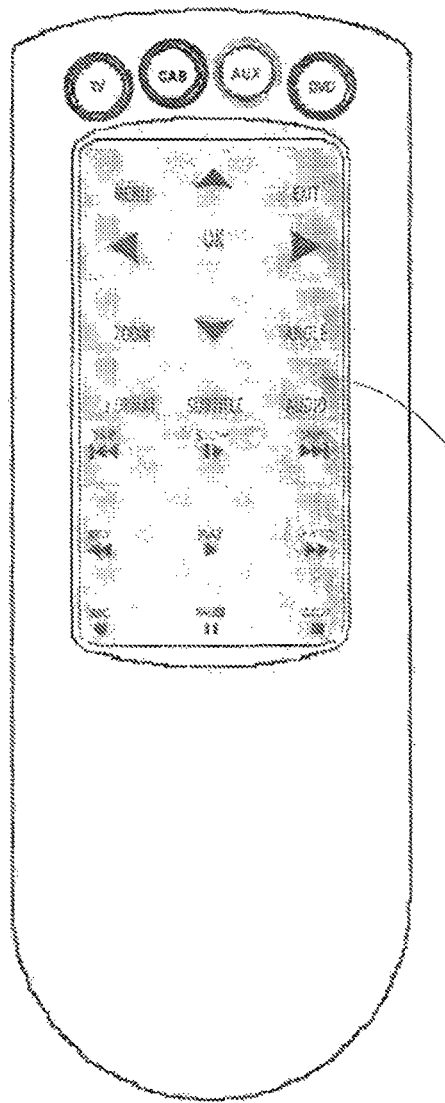
Figure 11D:
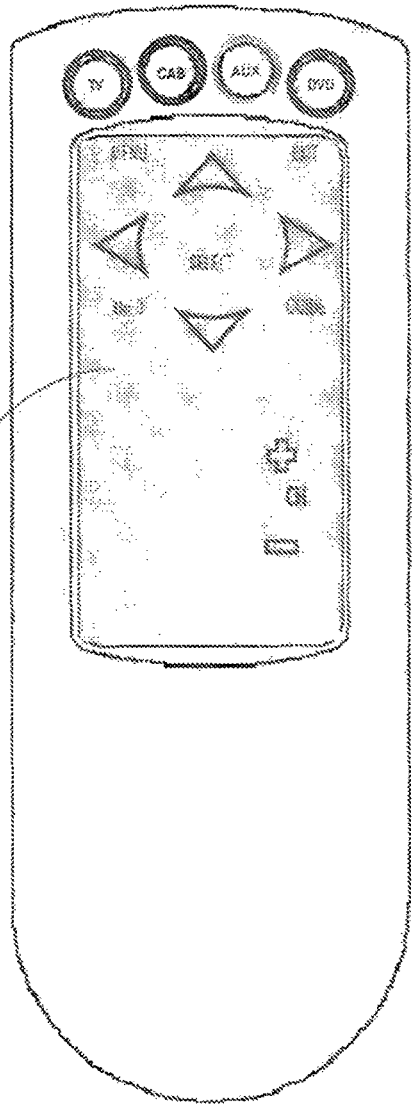

By way of example, FIG. 11b illustrates the appearance of face panel 801' when the face panel 801' is internally illuminated with red light (in the illustrated example, the user interface displayed corresponds to the TV device mode in which the labels printed in ink responsive to red wavelengths—e.g., labels having a reddish color—are more prominently displayed relative to the other labels); FIG. 11c illustrates the appearance of face panel 801' when the face panel 801' is internally illuminated with green light (in the illustrated example, the user interface displayed corresponds to the DVD device mode in which the labels printed in ink responsive to green wavelengths—e.g., labels having a greenish color—are more prominently displayed relative to the other labels); and FIG. 11d illustrates the appearance of face panel 801' when the face panel 801' is internally illuminated with blue light (in the illustrated example, the user interface displayed corresponds to the Cable device mode in which the labels printed in ink responsive to blue wavelengths—e.g., labels having a bluish color—are more prominently displayed relative to the other labels). Although the renderings in FIGS. 11b through 11d for convenience of illustration do not depict the non-active icons or labels at all, it will be appreciated that in practice these labels may still be faintly visible: it is the intent of the invention to bring the active icon or label into prominence, not to render the non-active icons and labels completely invisible, although such may be possible. In general, to achieve the benefits of this invention it is sufficient that the non-active icons and labels be of low perceived visibility relative to the icons or labels associated with the active key functions.

It will further be understood by those skilled in the art that the particular methods and techniques used to effect responsiveness to light energy in a display element may include phosphorescence, fluorescence, reflectivity, diffusion, filtering, absorption, Lasing, and other techniques. In this regard, combinations of conventional and/or photochromatic inks may be utilized to imprint labels on a display element and appropriate corresponding sources of energy utilized to bring desired user interface elements into prominence. Additionally, as described above, translucent LCD techniques which make use of selective masking or filtering of ambient light passing through the face panel may be used, either alone or in conjunction with the above techniques to create areas of selective prominence on the face panel to present to a user. Furthermore it will be appreciated that the light wavelength, range of wavelengths, or other electromagnetic energy signals used to interact with a given display element may differ from the actual visible light color experienced by a user, for example, an ultraviolet (UV) light source may be used to illuminate a fluorescent display element. Another strategy is to use interference filters to change viewing angles so that the color changes with the viewing angle. Still further, it is contemplated that heat energy may be used to cause the inks of certain labels, e.g., imprinted using thermochromic inks, to appear more prominently relative to other labels.

It will also be appreciated that one goal of the present invention is to maximize the transparency of the face panel 801 while still allowing for various display portions to be selectively brought to prominence to enhance user interaction. As such, those skilled in the art will understand that varying levels of transparency for the face panel are possible given appropriate combinations of the illumination source and the particular chemical composition, fabrication, or physical makeup of each icon and/or label.

While the foregoing describes controlling devices 100 that use color to disseminate information, it is contemplated that other identification schemes (which may be used in addition to or in lieu of color) may be provided to similarly indicate relationships between function keys and appliances, the controlling device and user operational modes, and/or the controlling device and room operational modes. For example, information may be provided by controlling the tint, contrast, or brightness of displayed function keys and/or area(s) visually associated with function keys, a display face, etc. Still further, information may be provided by providing a visually identifiable pattern, shape, icon, or alphanumeric tag to a function keys and/or area(s) visually associated with function keys (e.g., imposing a crosshatch or other pattern on all function keys associated with a particular appliance, using commonly shaped function keys for an associated appliance, surrounding each function key with (or appending in super/subscript fashion) a shape or icon representing the associated device, appending an alphanumeric tag on or near a function key indicating the associated appliance, etc.). Yet further, information may be provided by using a distinct audible sound tag. Distinction between the sound tags may be achieved by allowing sounds to repeat in different numbers, emitted using different frequencies, and/or emitted in different sequences/patterns. Distinct sound tags may also be generated using a voice synthesizer. Such sound tags may also be in the form of sound labels that may be recorded via a microphone of the controlling device and later played back via a speaker of the controlling device. Again, recorded sound tags may be user spoken voice labels. In this manner, an event such as activation of a function key, movement of the controlling device, etc. may cause the controlling device to emit a sound tag whereby information is disseminated to the user.

In some instances it may also be desirable to allow a user to hear a sound tag prior to an action that is associated with that sound tag being performed by the controlling device. For example, function keys may be provided that, when depressed a first time cause their associated sound tag to be emitted from the remote control and then, when pressed a second time, cause the remote control to perform an action that has been associated with that function key, e.g., to cause the transmission of programmed macro commands. Preferably, the action is performed only if the function key is activated a second time within a predetermined time-out period which is initiated after the first activation of the function key which caused the emission of the sound tag. Yet further, function keys may be provided that cause the emission of a sound tag when slightly depressed and which cause the action associated with that function key to be performed when the function key is more fully depressed. In either instance, it is to be understood that the use of sound tags allows a user to identify what function or functions will be performed in response to activation of a function key which is particularly useful in the case of macro keys which are usually unlabeled or blank programmable keys provided on a controlling device.

Figure 7:
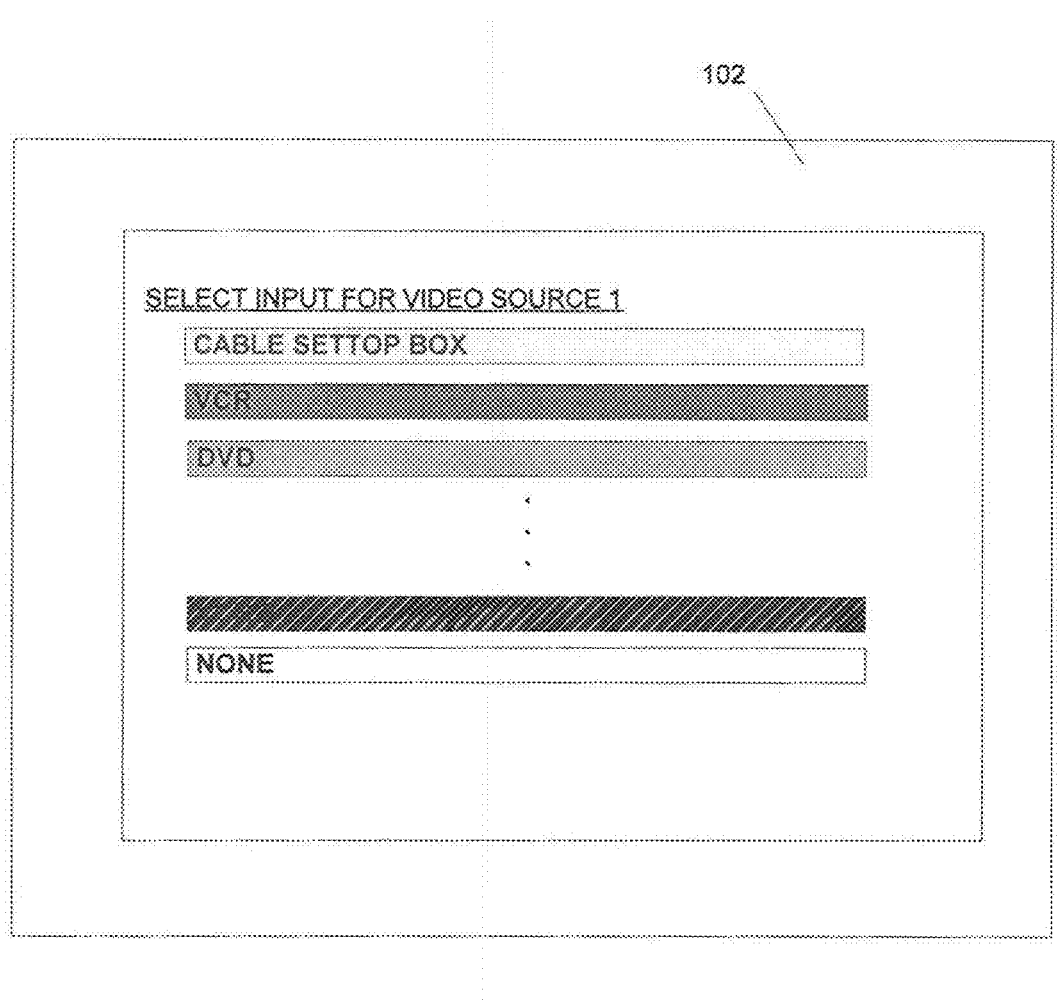
FIG. 7 illustrates an exemplary television input selection menu display in which video source choices are color coordinated with the controlling device function keys.

With reference to FIGS. 1 and 7 visual and/or audio cues may also be utilized in connection with appliance setup processes. For example, in some cases an appliance (e.g., television 102) may be setup to receive input(s) from one or more appliances (e.g., audio-visual input from cable box 104 and/or VCR 106). In such a case, in connection with the receiving appliance being setup to designate input or transmitting appliance(s), cues may be presented to the user that function to represent the transmitting appliance(s) (e.g., a Cable source may be provided with a yellow cue, a VCR source may be provided with a green cue, a DVD source provided with a blue cue, etc. as illustrated in FIG. 7). The cues provided to represent the transmitting appliances during setup processes may be pre-selected and/or user selectable.

The cues utilized to represent the transmitting appliances during an appliance setup process may then be used to represent an intended target appliance for function keys (and device modes) of the controlling device 100. For example, in the example illustrated in FIG. 7, the VCR is provided with a green colored cue which is utilized to represent the VCR during the appliance setup process. Accordingly, the same green colored cue may be associated with function keys of the controlling device 100 that have the VCR as an intended target appliance. In certain cases, such as when the controlling device 100 is supplied with the appliance that is to be setup, it may be preferred to have the cue and appliance relationships predefined in both the controlling device 100 and the appliance to be setup to ensure consistency between the utilized cues. In certain other case, cue/appliance relationships utilized during the setup process can be communicated from the appliance being setup to the controlling device 100 (for example using IR or RF transmissions). Such a communication may include data that functions to identify the appliance type of any selected inputs and the cues associated with those appliance(s) whereby the controlling device 100 may use the data to set itself up to use the same cue to represent the same appliance(s) (i.e., in association with function keys when the appliance is to be an intended target appliance and/or in association with a device mode key to which the appliance has been assigned).

While various concepts have been described in detail, it will be appreciated by those skilled in the art that various modifications and alternatives to those concepts could be developed in light of the overall teachings of the disclosure. For example, it should be appreciated that particularly where controlling devices having multi-color display screens are involved (i.e., PDA or other LCD based controlling devices), many combinations and variations of the above described function key association features are possible without departing from the spirit and scope of the present invention. As such, the particular concepts disclosed are meant to be illustrative only and not limiting as to the scope of the invention which is to be given the full breadth of the appended claims and any equivalents thereof.

All documents cited within this application for patent are hereby incorporated by reference in their entirety.

What is claimed is:

1. A method for using a controlling device to direct attention of a user to at least one controllable functional operation of a home entertainment system having a plurality of controllable devices including a display device, comprising:

sending at least one instruction from the home entertainment system to the controlling device, the at least one instruction sent to the controlling device being an instruction to cause the controlling device to provide at least one of a plurality of input elements of the controlling device with a predetermined appearance wherein the at least one of the plurality of input elements of the controlling device provided with the predetermined appearance is activable to cause the controlling device to issue a communication to control at least one controllable functional operation of the home entertainment system that is associated with a content the home entertainment system is causing to be displayed in the display device associated with the home entertainment system; and causing the controlling device to use the instruction received from the home entertainment device to cause the at least one of a plurality of input elements of the controlling device to have the predetermined appearance to thereby direct attention of the user to the at least one controllable functional operation of the home entertainment system when the content is caused to be displayed in the display device.

2. The method as recited in claim 1, wherein the plurality of input elements of the controlling device provided with the predetermined appearance comprise input elements for controlling navigation operational functions of at least one of the plurality of devices within the home entertainment device system.

3. The method as recited in claim 1, wherein the plurality of input elements of the controlling device provided with the predetermined appearance comprise input elements for controlling volume operational functions of at least one of the plurality of devices within the home entertainment device system.

4. The method as recited in claim 1, wherein the predetermined appearance provided to the least one of the plurality of input elements comprises causing the at least one of the plurality of input elements to be illuminated in a predetermined color.

5. The method as recited in claim 1, wherein the predetermined appearance provided to the at least one of the plurality of input elements comprises causing a predetermined indicia to be displayed in association with the at least one of the plurality of input elements.

6. The method as recited in claim 1, wherein the predetermined appearance provided to the at least one of the plurality of input elements comprises causing a predetermined label to be displayed in association with the at least one of the plurality of input elements.

7. The method as recited in claim 1, wherein the plurality of input element comprises soft keys displayed in a touch screen display of the controlling device.

8. The method as recited in claim 1, wherein the plurality of input elements comprises hard keys of the controlling device.

9. The method as recited in claim 1, wherein the home entertainment system includes a settop box device and wherein the display device comprises a television.

10. The method as recited in claim 1, wherein the controlling device uses an infrared communication protocol to issue the communication to the home entertainment system to control at least one controllable functional operation of the home entertainment system that is associated with the content the home entertainment device is causing to be displayed in the display device.

11. The method as recited in claim 1, wherein the controlling device uses a radio frequency communication protocol to issue the communication to the home entertainment system to control at least one controllable functional operation of the home entertainment system that is associated with the content the home entertainment system is causing to be displayed in the display device.

* * * * *